Feb. 13, 1934.   P. B. GODDARD ET AL   1,947,004
METHOD OF ASSEMBLING ROLLER BEARINGS
Filed March 18, 1933

INVENTORS.
Paul B. Goddard.
Frank Ketcham.
BY
Harness, Dickey, Pierce & Hann.
ATTORNEYS.

Patented Feb. 13, 1934

1,947,004

UNITED STATES PATENT OFFICE 1,947,004

METHOD OF ASSEMBLING ROLLER BEARINGS

Paul B. Goddard and Frank Ketcham, Dearborn, Mich., assignors to Universal Products Co. Inc., a corporation of Delaware Application March 18, 1933. Serial No. 661,445

3 Claims. (Cl. 29—84)

This invention relates to a method of assembling roller bearings particularly suitable for universal joints and the like.

The main objects of this invention are to provide an improved method of quickly and readily assembling a plurality of roller bearings in proper position between the bearing faces of inner and outer bearing members; to provide a method of assembling a roller bearing in which the entire group of roller bearings is assembled onto an inner bearing member or trunnion in a single operation, and to provide an improved method of assembling roller bearings in which the rollers are snugly held in proper position by a temporary roller holder until the final assembly operation, at which time the temporary roller holder is ejected from the assembly.

An illustrative embodiment of this invention as applied to one type of a universal joint is shown in the accompanying drawing, in which.

In carrying out this improved method of assembling roller bearings, the inner face of an outer bearing member 7 is first coated with grease, or the like, and then a plurality of rollers 8 are assembled in parallel contacting axially extending relation around the greased bearing face of the member 7 with the rollers at least partially embedded in the grease so as to hold them in position pending the insertion of a plug 9.

The plug 9 is provided with an annular head which forms a radially extending shoulder for overlapping and abutting against the adjacent ends of the rollers 8 for preventing axial movement of the rollers past the plug. The body 10 of the plug is of less axial length than the length of the rollers 8 so as to leave the opposite end of the assembly open. The body 10 of the plug is of substantially the same diameter as the inner bearing member or trunnion upon which the assembly is finally positioned so that the plug, together with the grease in which the rollers are partially embedded, will hold the rollers snugly around the inner periphery of the outer bearing member 7.

Figure 1:
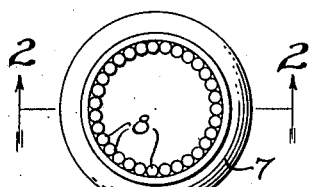
Fig. 1 is a plan view showing an outer bearing member having a plurality of relatively slender rollers arranged and positioned around the inner bearing face thereof.
Figure 2:
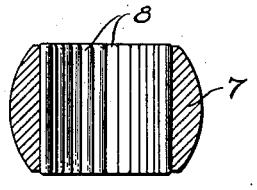
Fig. 2 is a sectional view taken on the line 2—2 of Fig. 1 looking in the direction indicated by the arrows.
Figure 3:
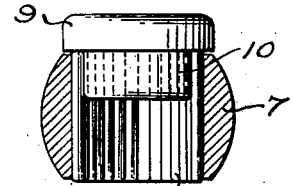
Fig. 3 is a sectional view similar to Fig. 1 but showing the headed plug inserted in the assembly for temporarily holding the rollers in position.
Figure 4:
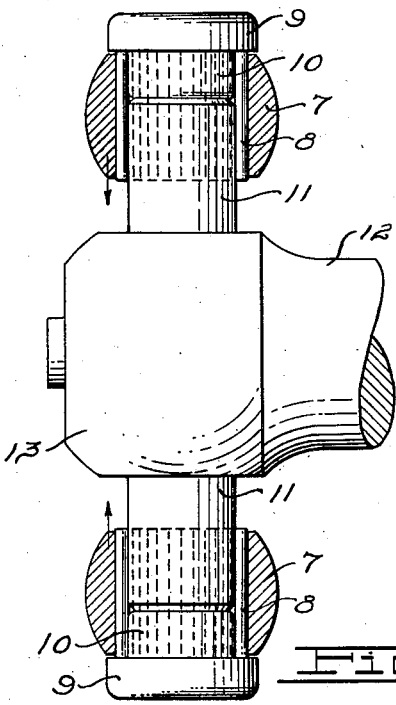
Fig. 4 is a view partly in elevation and partly in section of the shank head of a two trunnion universal joint showing the roller bearing assemblies positioned on the ends of the trunnions preparatory to final assembly.
Figure 5:
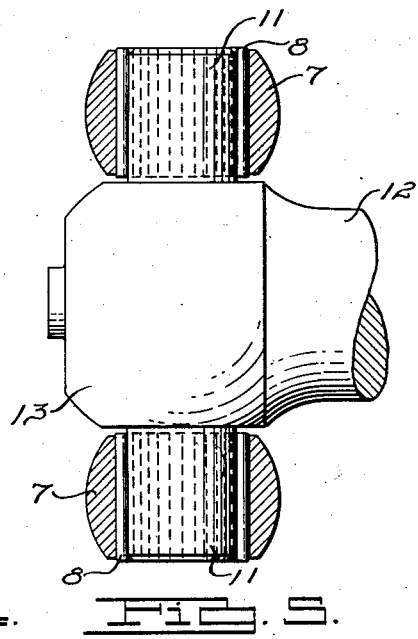
Fig. 5 is a view similar to Fig. 4 showing the roller bearing assemblies in final position.
Figure 6:
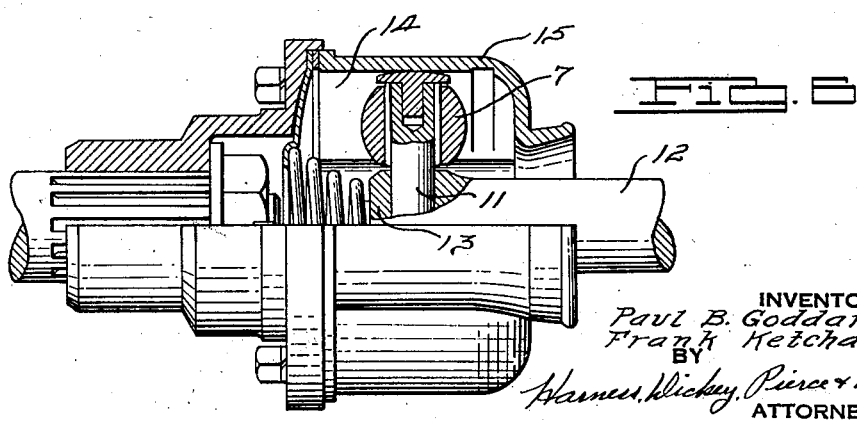
Fig. 6 is a view partly in section and partly in elevation of the type of universal joint in connection with which this invention is illustrated.

The assembly of outer bearing member, rollers and plug, as shown in Fig. 3 in the drawing, is then placed or positioned adjacent the end of an inner bearing member or trunnion 11 in axial alignment therewith and moved axially toward the trunnion so as to cause the outer end of the trunnion to enter the open end of the assembly. Movement of the assembly axially of the trunnion 11 is continued so as to cause the outer end of the trunnion to abut against and eject the plug 9 from the assembly when the bearing is in final position, as shown in Fig. 5 of the drawing.

The particular universal joint upon which the invention is herein illustrated comprises a shank member 12 having a headed end 13 which is drilled perpendicularly to the axis of the shank 12 to receive the trunnion pin 11, the opposite ends of which project equal distances at the opposite side of the head 13.

These projecting ends form the trunnions or inner bearing members for the roller bearing assemblies, the outer bearing members 7 of which are in the form of truncated balls which ride in axially extending cylindrical guides 14 formed in an outer housing or casing 15.

The details of construction of this particular type of universal joint are set forth in the copending United States patent application of Archibald A. Warner, Serial No. 637,615, filed October 13, 1932.

In carrying out this improved method of assembling a roller bearing, the bearing face of the outer bearing member 7 is first coated with grease, or like substance, and the series or plurality of rollers 8 are positioned or arranged around this face by any suitable means.

The grease in which the rollers are at least partially embedded will hold the rollers in position on the bearing face until the plug 9 is inserted in one end of the assembly, the body of the plug snugly holding the rollers disposed about the inner periphery of the bearing member.

This assembly of bearing member, rollers and plug may then be transported around the shop, or elsewhere, to the assembly line, and at the time of final assembly the open ends of the units are slipped over the ends of the inner bearing member or trunnion and moved axially so as to cause the end of the trunnion to abut against the body of the plug and thereby eject the plug from the assembly.

Although but one particular application of this method has been herein described and shown, it will be understood that numerous variations of the method may be had without departing from the spirit of the invention as defined by the following claims.

We claim:

1. The method of assembling a roller bearing which comprises the arranging and positioning of a plurality of rollers around the inner face of an outer bearing member, inserting a headed plug of less length than the rollers axially into the assembly for holding the rollers in position, the head of the plug overlapping the adjacent ends of the rollers, positioning the assembly adjacent the end of a trunnion in substantially axial alignment therewith and then moving the outer bearing member with its rollers and the trunnion relative to each other axially so as to cause the trunnion to abut and eject the plug.

2. The method of assembling a roller bearing which comprises the coating of the inner face of an outer bearing member with grease or the like, arranging and positioning a plurality of rollers around such greased face, with the rollers at least partially embedded in the grease, inserting a plug axially into one end of the assembled rollers and bearing member, said plug terminating short of the other end of the assembly, inserting the end of an inner bearing member into the open end of the assembly while maintaining the rollers against axial displacement and then moving said assembly and inner bearing member relative to each other axially so as to cause the inner bearing member to abut and eject the plug.

3. The method of assembling roller bearings on the trunnions of a universal joint which comprises the coating of the inner face of an outer bearing member with grease or the like, arranging and positioning a plurality of rollers around such greased face, with the rollers at least partially embedded in the grease, inserting a headed plug into one end of the assembly with the head of the plug overlapping the adjacent ends of the rollers, said plug fitting snugly within the rollers to hold them disposed around the bearing face and being of less axial length than said rollers so as to leave the opposite end of said assembly open, placing the open end of the assembly on the end of a joint trunnion, and then moving the assembly axially on the trunnion so as to cause the trunnion to abut and eject the plug.

PAUL B. GODDARD.
FRANK KETCHAM.